United States Patent [19]
Inadama

[11] Patent Number: 6,059,592
[45] Date of Patent: May 9, 2000

[54] IC CARD CONNECTOR HAVING DETECTING SWITCH FOR DETECTING CORRECT INSTALLATION OF IC CARD

[75] Inventor: Masayuki Inadama, Miyagi-ken, Japan

[73] Assignee: Alps Electric Co., Ltd., Japan

[21] Appl. No.: 09/153,691

[22] Filed: Sep. 15, 1998

[30] Foreign Application Priority Data

Sep. 16, 1997 [JP] Japan .................................. 9-250634

[51] Int. Cl.⁷ .................................................. H01R 29/00
[52] U.S. Cl. ........................................... 439/188; 235/441
[58] Field of Search .................................. 439/188, 489, 439/630; 235/475, 476, 482, 483

[56] References Cited

U.S. PATENT DOCUMENTS

| | | | |
|---|---|---|---|
| 5,013,255 | 5/1991 | Juret et al. | 439/260 |
| 5,286,957 | 2/1994 | Defrasne | 235/441 |
| 5,330,363 | 7/1994 | Gardner et al. | 439/188 |
| 5,369,259 | 11/1994 | Bleier et al. | 235/441 |
| 5,395,259 | 3/1995 | Casses | 439/188 |
| 5,520,551 | 5/1996 | Broschard, III | 439/567 |
| 5,674,085 | 10/1997 | Davis et al. | 439/188 |
| 5,775,937 | 7/1998 | Bricaud et al. | 439/489 |

*Primary Examiner*—Renee S. Luebke
*Assistant Examiner*—Michael C. Zarroli
*Attorney, Agent, or Firm*—Brinks Hofer Gilson & Lione

[57] ABSTRACT

An IC card connector having a detecting switch for detecting correct installation of the IC card is provided.

The actuator of the detecting switch is provided with a projected tongue piece obliquely protruding toward the card insertion section, in a manner such that the projected tongue piece is adapted to be driven in the IC card's thickness direction by the IC card just before the completion of its insertion. Therefore, an elastic force of the actuator (this force will exert on the IC card which has been inserted in its loading position) may be made generally orthogonal to the IC card's discharge direction. In this way, with the passing of time even if there occurs a deterioration in the clamping force of the connector for clamping the IC card, the IC card will not be pushed by the detecting switch in its discharge direction. Thus it is possible to avoid a position deviation of the IC card when in its inserted position.

1 Claim, 10 Drawing Sheets

FIG. 11A
FIG. 11B
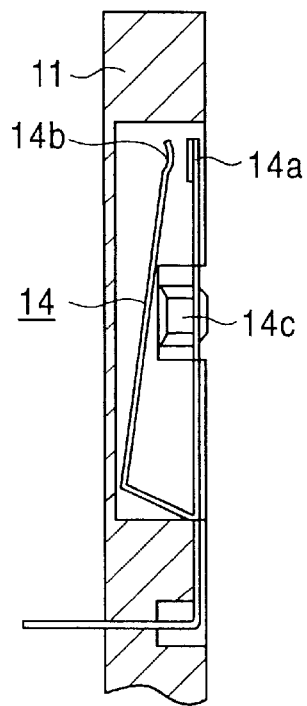
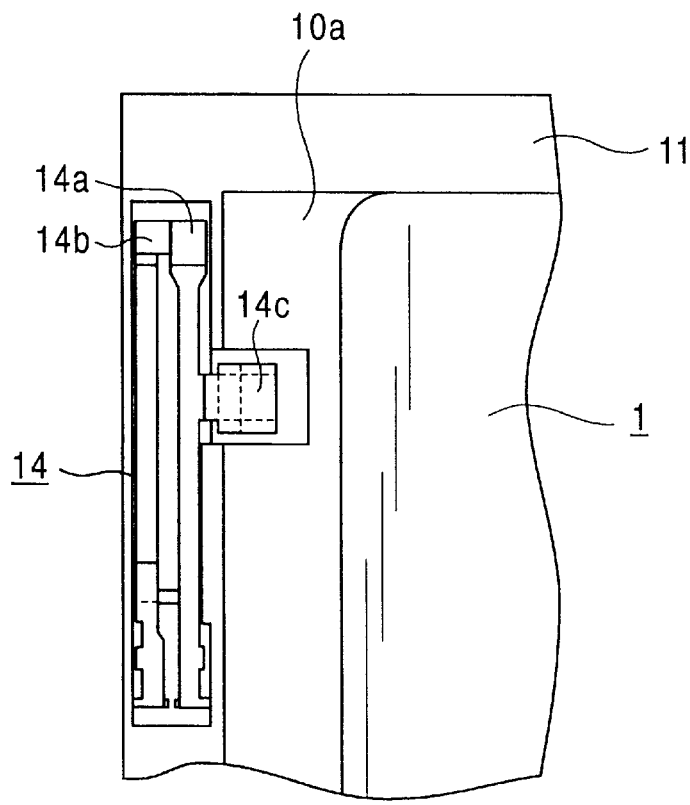

FIG. 12A
FIG. 12B
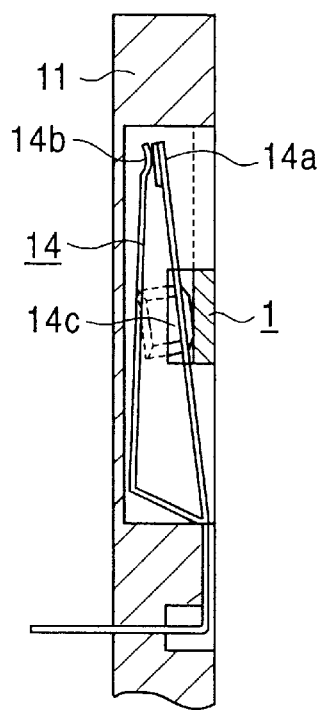
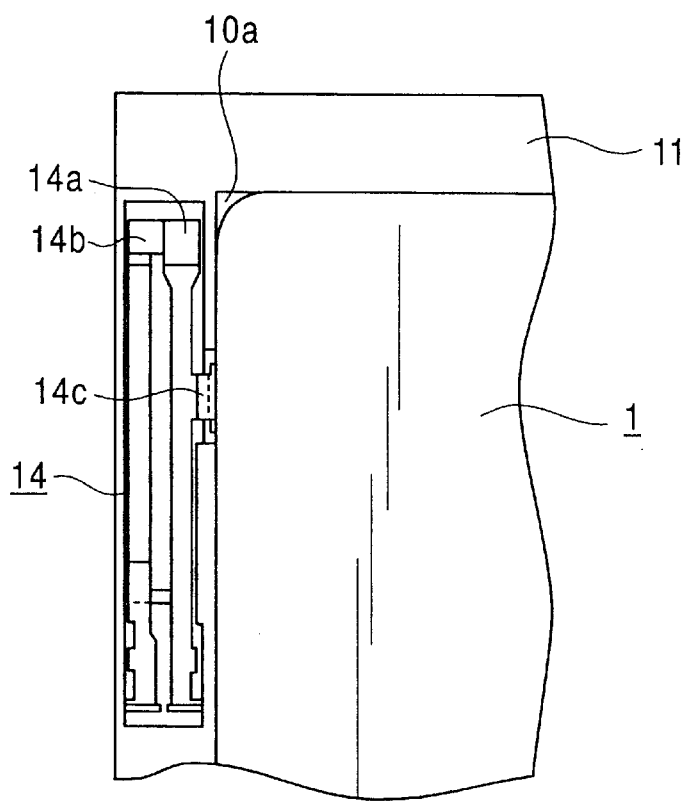

FIG. 15A
PRIOR ART
FIG. 15B
PRIOR ART
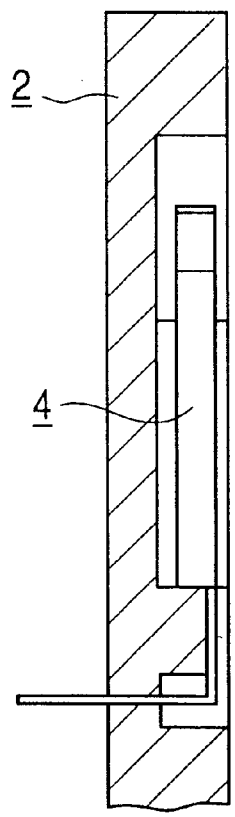
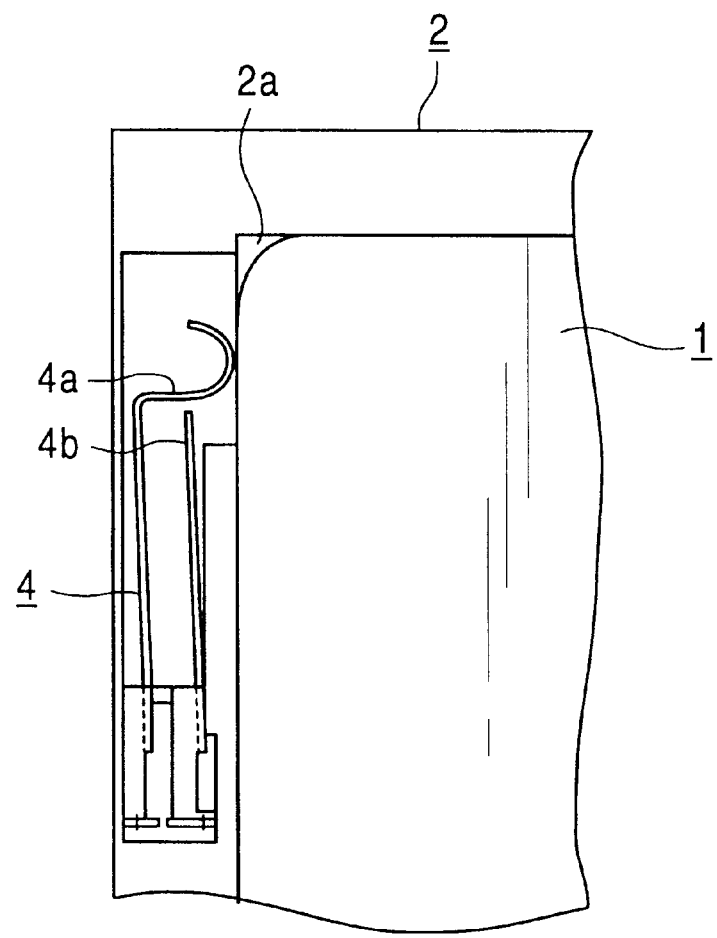

IC CARD CONNECTOR HAVING DETECTING SWITCH FOR DETECTING CORRECT INSTALLATION OF IC CARD

BACKGROUND OF THE INVENTION

1. Field of the Invention

The present invention relates to a connector for use with an IC card, which connector is employed to send signal into or obtain signal from the IC card inserted in position. In particular, the present invention provides an improvement for a detecting switch contained in the connector, so as to effectively detect whether or not the IC card has been inserted in position.

2. Description of the Related Art

An IC card is a card provided with an integral circuit capable of performing a predetermined calculation and an information storing. Usually, such an IC card is used as a medium to perform information processing in an information processing machine such as a personal computer or digital camera. Further, a personal computer or a digital camera is equipped with a connector (for use with the IC card) which has a plurality of terminals corresponding to a plurality of contact points provided on the bottom surface of the IC card.

Such an IC card connector is usually formed with an insertion section into which an IC card may be inserted, so that once an IC card is completely inserted in position, the plurality of contact points of the IC card may get in contact with the plurality of terminals of the connector, thereby permitting a desired signal transmission.

FIG. 13A indicates a condition where once an IC card 1 is inserted into an inmost area of an insertion section 2a of a connector 2, a plurality of contact points 1a provided on the bottom surface of the IC card 1 will get in contact with a plurality of terminals 3 of the connector 2. Each terminal 3 has a contact portion 3a protruding toward the insertion section 2a.

With the above structure, if the IC card 1 is inserted into the insertion section 2a but has not reached a predetermined loading position as shown in FIG. 13B, the contact points 1a of the IC card 1 will not get in contact with the corresponding terminals 3. As a result, it is impossible to perform a predetermined signal transmission.

In order to solve the above problem, there has been suggested that a detecting switch be provided in the IC card connector so as to detect whether or not the IC card has been properly inserted in the card insertion section. This detecting switch is so constructed that it may be driven (pushed) by the IC card just before the completion of its insertion, thereby effecting an On/Off change-over for the contact points. Accordingly, if the IC card has not been completely inserted in a predetermined position as shown in FIG. 13B, the detecting switch will not operate. In this way, the detecting switch may be effectively used to avoid any possible damage to various electronic components, which may otherwise occur due to an uncompleted contact between the contact points of the IC card and the terminals of the connector or because the contact points of the IC card and terminals of the connector are contacted with each other in undesired positions.

FIGS. 14 and 15 are explanatory views illustrating a prior art where a detecting switch has been incorporated in an IC card connector. In more detail, FIGS. 14A and 14B are explanatory views illustrating a condition where a detecting switch is in a waiting position when viewed from one side and from the above, FIGS. 15A and 15B ace explanatory views illustrating a condition where a detecting switch is in its detecting position when viewed from one side and from above.

As shown in FIGS. 14 and 15, a detecting switch 4 is provided in a position adjacent to an inmost position of the insertion section 2a so as to detect whether or not an IC card has been fully inserted in position. Such detecting switch 4 includes an actuator 4a which is made of an electrically conductive material and is fixed in position through one end thereof in a manner such that it is flexibly deformable in a direction in which the IC card is inserted or pulled out. In fact, the detecting switch 4 is so arranged that it faces a contact element 4b and may get in contact with or leave the contact element 4b.

Referring again to FIG. 14B, when the IC card 1 has not reached a predetermined inmost position in the card insertion section, the actuator 4a is elastically urged against the contact member 4b due to its own elasticity, so that the detecting switch 4 is in an ON position. On the other hand, as shown in FIG. 15B, when the IC card 1 has reached the predetermined inmost position, since a front portion of the IC card 1 is caused to press the actuator 4a in the same direction in which the IC card is inserted, the actuator 4a will be urged away from the contact element 4b, thereby rendering the detecting switch 4 to be in its Off position. In this manner, by virtue of On/Off change-over operation of the detecting switch 4, it is sure to detect whether or not the IC card has been inserted properly (in the inmost position) in the IC card insertion section 2a.

In this way, the IC card 1, upon being inserted in the inmost position of the card insertion section 2a, will receive a clamping force from both sides thereof due to a contact pressure caused by the terminals of the connector 2, the IC card 1 may be held in a loading position of the card insertion section 2a. Hence, when the IC card 1 has been inserted in the loading position of the card insertion section 2a, the actuator 4a will be pressed inwardly by the IC card 1. At this moment, a reaction force will be generated by the actuator 4a, causing the IC card 1 to be urged in a direction in which the IC card is to be discharged. This, however, will cause a deterioration in the clamping force of the connector 1 (for clamping the IC card when it is in an inserted position) with the passing of time. As a result even though the IC card 1 may be properly inserted in position in the IC card insertion section 2a, the IC card will be urged by the reaction force of the actuator 4a in a direction the IC card is to be discharged, hence the IC card 1 is likely to deviate from its correct position, making it impossible to perform a predetermined signal transmission.

SUMMARY OF THE INVENTION

In view of the above discussed problems associated with the above mentioned prior arts, it is an object of the present invention to provide an improved IC card connector capable of preventing an IC card from being pressed outwardly by a detecting switch, even if use over a long period causes a deterioration in a clamping force of the connector for clamping the IC card.

According to an aspect of the present invention, there is provided an IC card connector, comprising: a housing including a card insertion section into which an IC card may be inserted; a plurality of terminals each having a cantilever beam configuration secured through one end thereof on the housing, and each having a contact portion on a free end thereof, said contact portion being formed in a manner such that it is protruding toward the card insertion section; a detecting switch located adjacent to an inmost position of the card insertion section, said detecting switch including an actuator and a contact element, the actuator being made of an electrically conductive material and adapted to be driven by an IC card just before the completion of its insertion, said actuator being also capable of coming into contact with the contact element and moving away therefrom so as to detect whether the insertion of the IC card is completed or not. In particular, the actuator of the detecting switch is provided with a projected tongue piece obliquely protruding toward the card insertion section, in a manner such that the projected tongue piece is adapted to be driven in the IC card's thickness direction by the IC card just before the completion of its insertion.

According to an aspect of the present invention, the actuator is fixed at a base end thereof on the housing so that a free end thereof is capable of getting into contact with the contact element and moving away therefrom, said actuator is further provided with the projected tongue piece at a middle position between the free end and the base end thereof, in a manner such that the projected tongue piece is protruding toward the outside of the actuator.

BRIEF DESCRIPTION OF THE DRAWINGS

FIG. 11A is an enlarged fragmentary side elevation view illustrating a condition where a detecting switch is in a waiting position when viewed from one side.

FIG. 11B is an enlarged fragmentary plan view illustrating a condition where a detecting switch is in a waiting position when viewed from the above.

FIG. 12A is an enlarged fragmentary side elevation view illustrating a condition where a detecting switch is in its detecting position when viewed from one side.

FIG. 12B is an enlarged fragmentary plan view illustrating a condition where a detecting switch is in its detecting position when viewed from the above.

FIGS. 15A and 15B are enlarged fragmentary side and plan elevation views respectfully views illustrating a condition where a detecting switch is in its detecting position when viewed from one side and from the above.

DESCRIPTION OF THE PREFERRED EMBODIMENTS

An embodiment of the present invention will be described with reference to the accompanying drawings.

Figure 1:
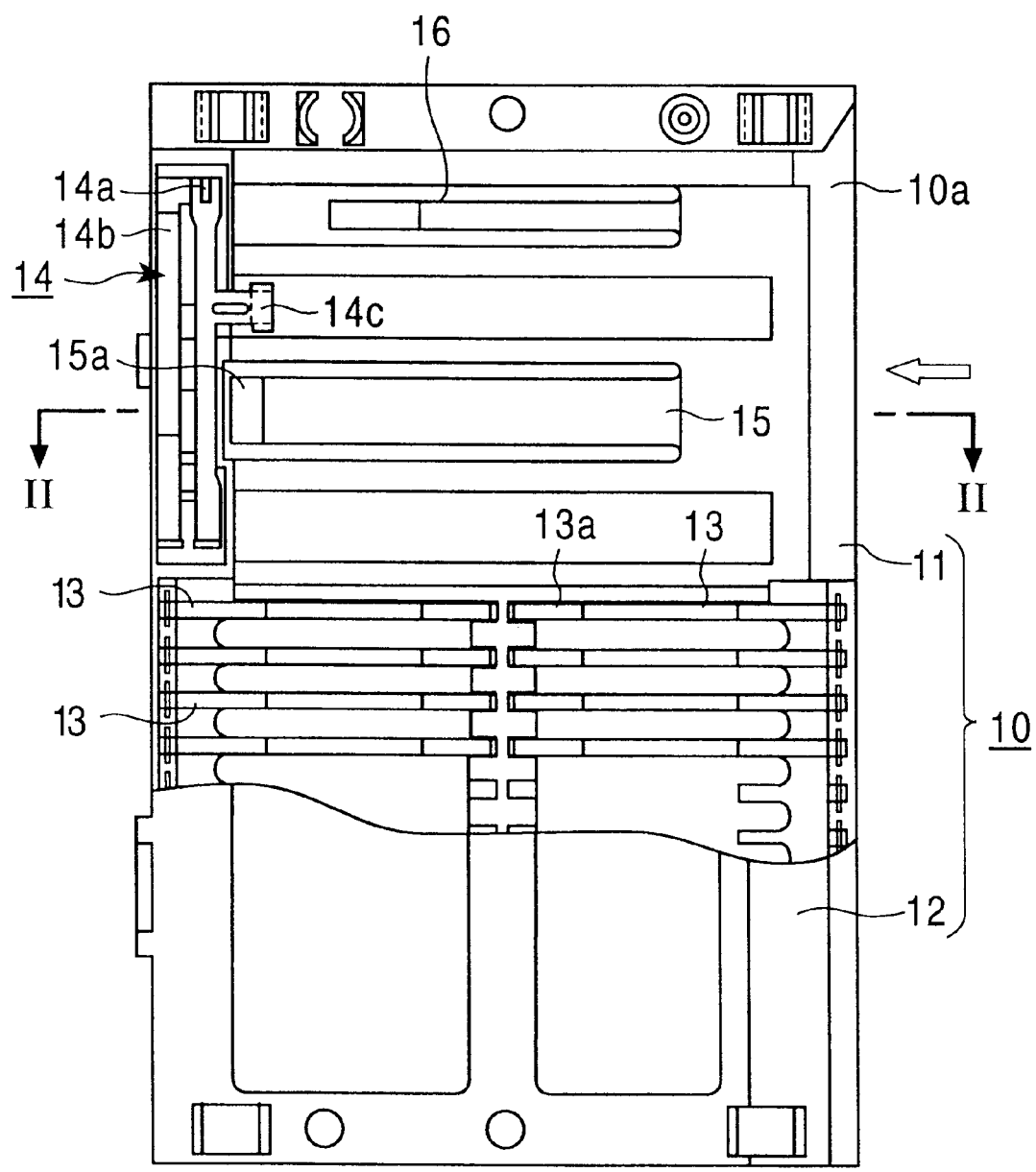
FIG. 1 is a partially sectional plane view illustrating an IC card connector made according to an embodiment of the present invention.
Figure 2:
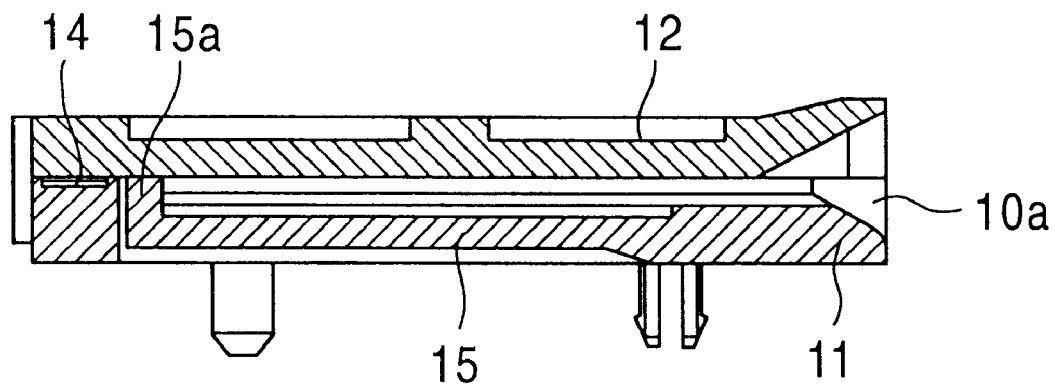
FIG. 2 is a cross sectional view illustrating the IC card connector of FIG. 1, taken along II—II line thereof.

As shown in FIGS. 1 and 2, a connector for use with an IC card, made according to an embodiment of the present invention, comprises a base 11 made of a synthetic resin, an upper cover 12 also made of a synthetic resin, both of which are connected together in a manner as shown in the drawings. In fact the base 11 and the upper cover 12 together form a housing 10 having a card insertion section 10a. A plurality of terminals 13 each having a convex contact portion 13a at its free end, are proved on the base 11 in a manner such that each terminal 13 is fixed in position through one end thereof. Moreover, a detecting switch 14 is installed on the base 11 to detect whether or not an IC card 1 has been completely inserted in position in the card insertion section 10a. In addition, an elongate elastic member 15 is fixed through one end thereof on the base 11, in a manner such that it is extending in the IC card's insertion direction (shown by an arrow in FIG. 1). Further, an elongate leaf spring 16 is provided on the base 11 so that an IC card inserted in the card insertion section 10a will be pressed against the upper cover 12, thereby providing the upper cover 12 with a guiding function.

The plurality of terminals 13 are provided corresponding to a plurality of contact points 1a formed on the bottom surface of the IC card 1. In order to effect an elastic contact with the contact points 1a, the contact portion of each of the terminals 13 is formed to protrude to some extent toward the interior of the card insertion section 10a. The elongate elastic member 15 is formed on the free end thereof with a click projection 15a which is protruding toward the interior of the card insertion section 10a and will be driven by the front end portion of the IC card just before the IC card is completely inserted in a predetermined position of the card insertion position 10a. In particular, the click projection 15a is designed so as to be located in the vicinity of the detecting switch 14. The detecting switch 14 is provided close to an inmost position of the card insertion section 10a, and has an actuator 14a and a contact element 14b. The actuator 14a is made of an electrically conductive material (such as a metal) and is fixed at one end thereof on a predetermined position in a manner such that it is elastically deformable in the thickness direction of the housing 10. In more detail, the actuator 14a is so arranged that it can freely get contact with or leave the contact element 14b. Further, the actuator 14a has a projected tongue piece 14c located in generally middle position between the free end and the base end of the actuator 14a. In further detail, the projected tongue piece 14c is so arranged that it is downwardly inclined towards the card insertion section 10a. Moreover, the projected tongue piece 14c is so formed that it may be driven and pressed inwardly by the front portion of the IC card 1 just before it is completely inserted in a predetermined position in the card insertion section 10a.

Namely, as shown in FIGS. 11A and 11B, if the IC card 1 has not been inserted in the inmost position of the card insertion section 10a of the housing 10, the metal actuator 14a, due to its own rigidity, will be kept spaced apart from the contact element 14b, so that the detecting switch is in its OFF position. On the other hand, if the IC card 1 has been fully inserted in the inmost position of the card insertion section 10a, since the front end portion of the IC card I will get in contact with the projected piece 14c of the actuator 14a, the projected tongue piece 14c will be pressed in a downward direction. In this manner, the free end of the actuator 14a is pressed downwardly by the projected tongue piece 14c so as to get contact with the contact element 14b, thereby rendering the detecting switch 14 to be in its ON position. Therefore, if it is found that the detecting switch 14 has been changed over from its OFF state to its ON state, a user can determine that the IC card 1 has been completely inserted in a predetermined position in the card insertion section 10a.

In this embodiment of the present invention, once the IC card 1 is inserted into a predetermined position in the card insertion section 10a, the projected tongue piece 14c is pressed downwardly and this causes the actuator 14a to be pressed downwardly, thus a reaction force (elastic force) will occur on the actuator 14a. At this moment, since the reaction force (elastic force) of the actuator 14a is directed upwardly in a direction generally perpendicular to the IC card discharge direction, the IC card 1 may be prevented from being pushed in the IC card discharge direction, so as to avoid a problem of position deviation of an inserted IC card. This effect may remain the same all the time, even if use over a long period will bring about a deterioration in a clamping force of the connector which is necessary for clamping the IC card when in its inserted condition. In addition, since the free end of the actuator 14a may be moved for a relatively long stroke by only slightly pressing down the projected tongue piece 14c provided in a generally middle position between the free end and the base end of the actuator 14a, it is sure to exactly perform an ON/OFF change-over operation of the detecting switch 14.

Figure 3:
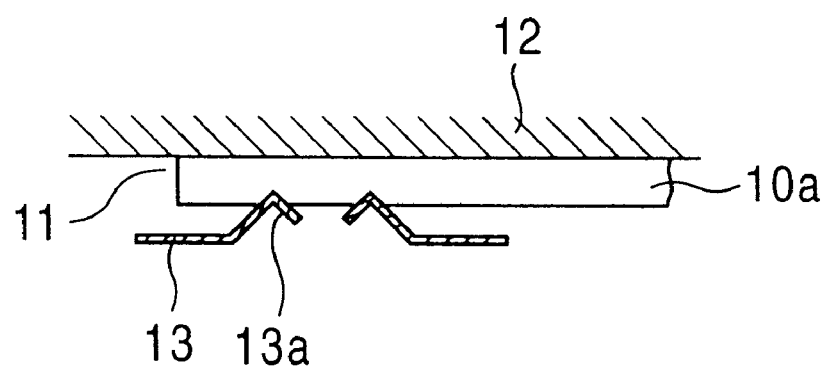
FIG. 3 is an enlarged fragmentary elevational view illustrating terminals provided on the IC card connector wherein the IC card has not been inserted.

The function of the elastic piece 15 and the insertion movement of the IC card 1 will be described in detail below. As shown in FIGS. 2 and 3, when an IC card has not been fully inserted in position in the card insertion section 10a, the elastic piece 15 will be kept parallel with the upper cover 12 without any bending. At this time, the click projection 15a on the free end of the elastic piece 15 is protruding to some extent in the vicinity of the detecting switch 14 toward the interior of the card insertion section 10a. Meanwhile, the contact portions 13a of the terminals 13 are also protruding to some extent toward the interior of the card insertion section 10a.

Figure 4:
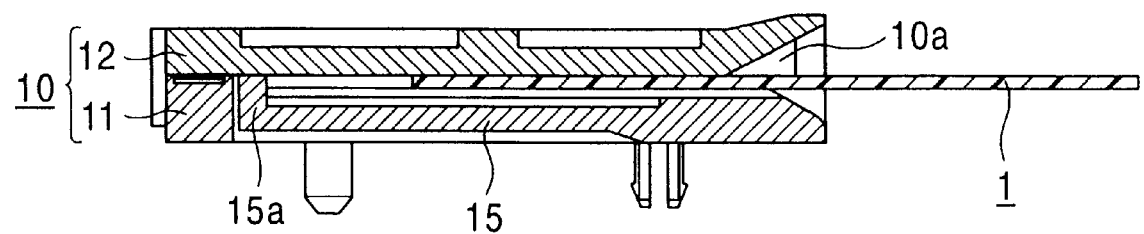
FIG. 4 is an elevational view illustrating a condition where the IC card has been inserted only half way in a card insertion section.
Figure 5:
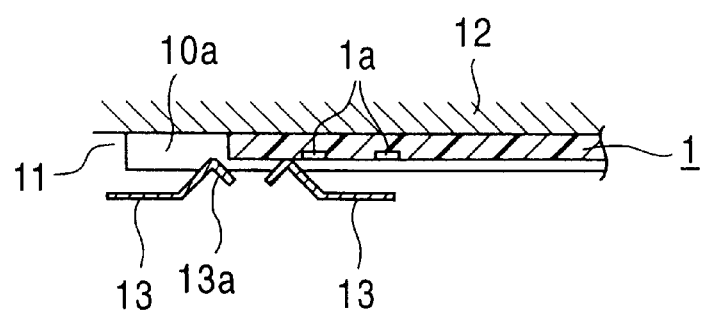
FIG. 5 is an enlarged fragmentary elevational view illustrating a relative positional relationship between the terminals of the connector and contact points of the IC card, when the IC card and the connector are in a condition shown in FIG. 4.
Figure 6:
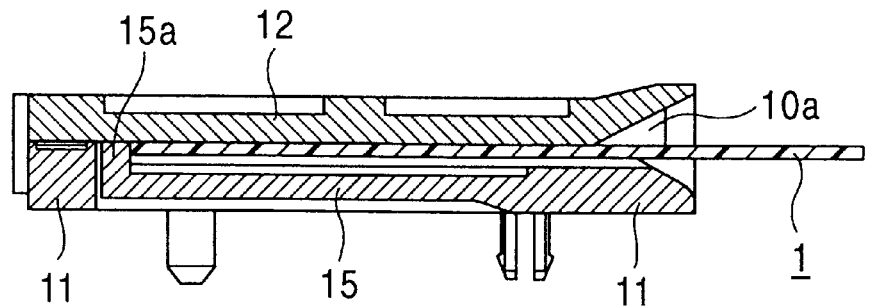
FIG. 6 is an elevational view illustrating a condition just before the IC card is fully inserted in the IC card insertion section.
Figure 7:
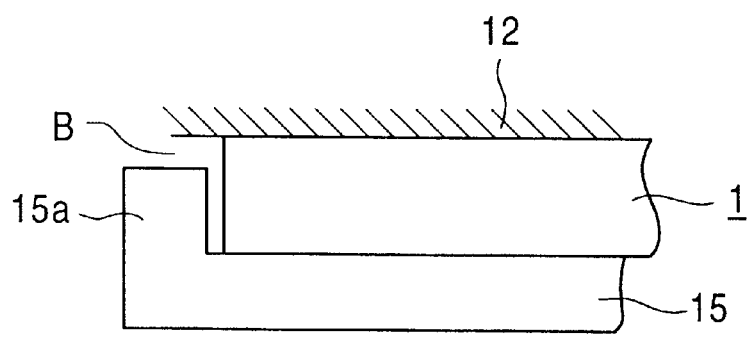
FIG. 7 is an enlarged view illustrating an important portion of FIG. 6.
Figure 8:
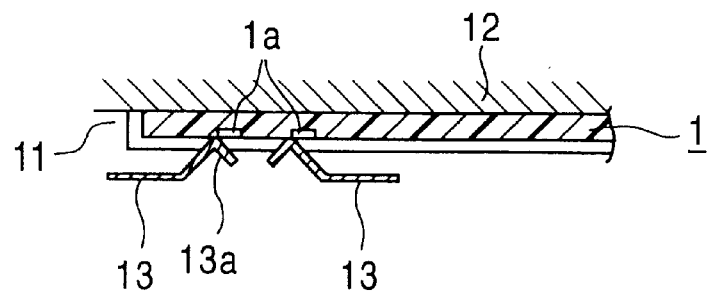
FIG. 8 is an enlarged fragmentary elevational view illustrating a relative positional relationship between the terminals of the connector and the contact points of the IC card, when the IC card and the connector are in a condition shown in FIG. 6.

On the other hand, as shown in FIGS. 4 and 5, when an IC card 1 is being inserted inwardly in the card insertion section 10a, the IC card 1 will be guided by the upper cover plate 12 when in moving so as to get in contact with the contact portions 13a of the terminals 13. Thus, as shown in FIGS. 6 and 8, as soon as the IC card 1 is inserted further toward the inmost position of the card insertion section 10a, the bottom surface of the IC card 1 will press down the contact portions 13a of the terminals 13. In this way, all the contact portions 13a of the terminals 13 will form an elastic contact with the bottom surface of the IC card 1, by virtue of an elasticity of the terminals 13 each of which is fixed at one end thereof on the connector. In fact, the click projection 15a of the elastic piece 15 will not receive any external force from the IC card 1 until the IC card 1 has reached the inmost position of the IC card insertion section 10a. At this time, as shown in FIG. 7, a small clearance is formed between the upper end of the click projection 15a and the upper cover 12. Further, the small clearance has a thickness which is less than ½ of the thickness of the IC card 1.

Figure 9:
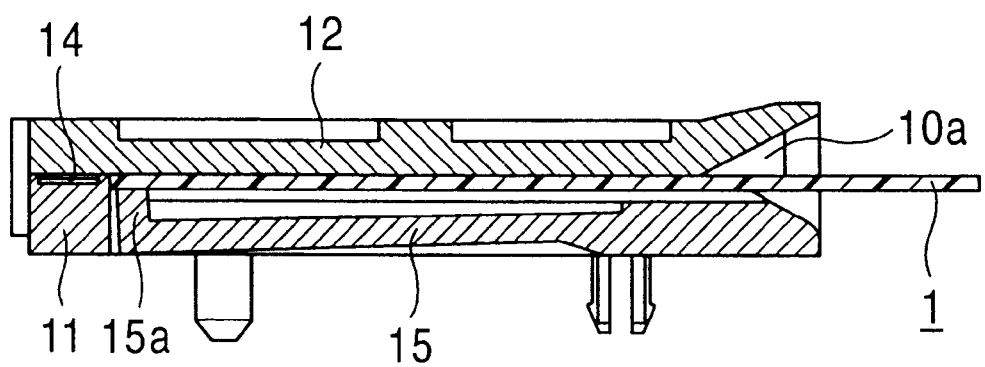
FIG. 9 is an enlarged fragmentary elevational view illustrating a condition where the IC card has been completely inserted in position in the card insertion section.
Figure 10:
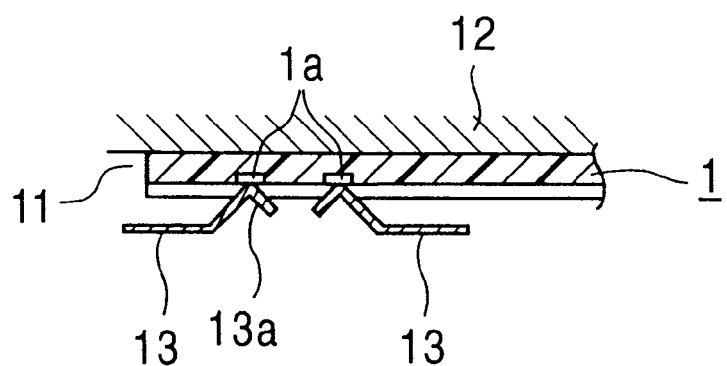
FIG. 10 is an elevational view illustrating a relative positional relationship between the terminals of the connector and the contact points of the IC card, when the IC card and the connector are in a condition shown in FIG. 9.
Figure 13A:
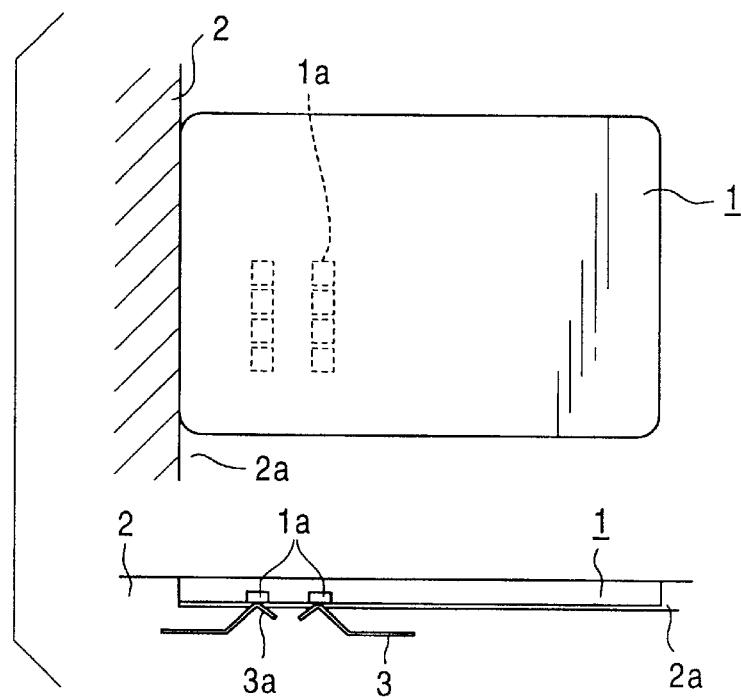
FIGS. 13A and 13B are plan and elevational views indicating a necessity of employing a detecting switch.
Figure 13B:
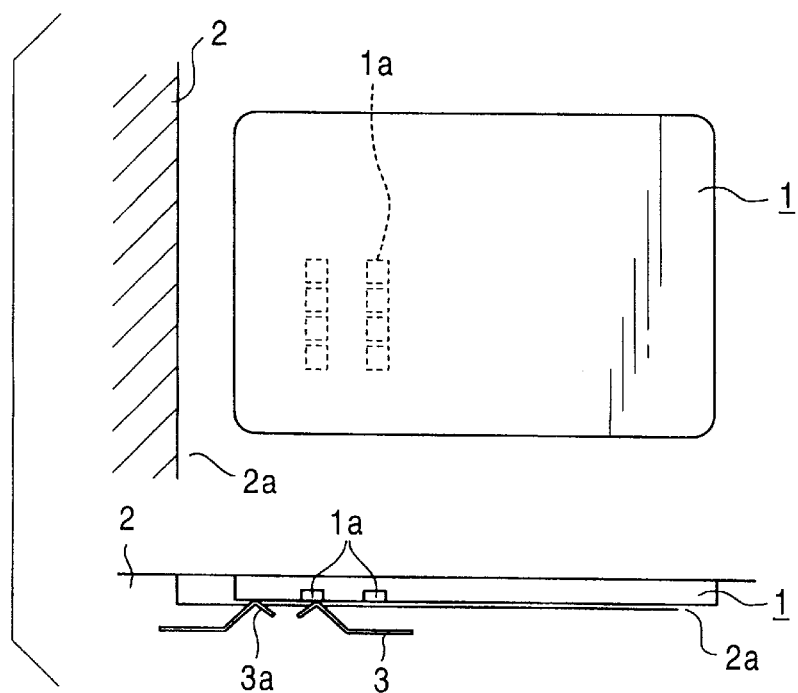
Figure 14A:
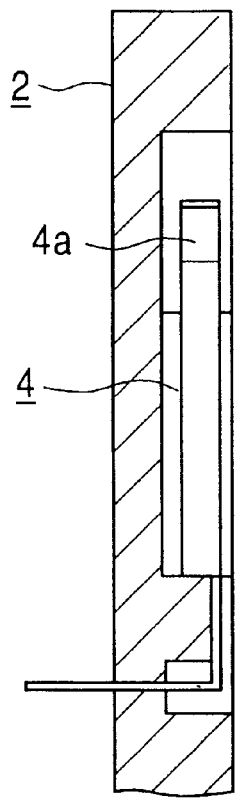
FIGS. 14A and 14B are enlarged fragmentary side and plan elevation views respectfully views illustrating a condition where a detecting switch is in a waiting position when viewed from one side and from the above.
Figure 14B:
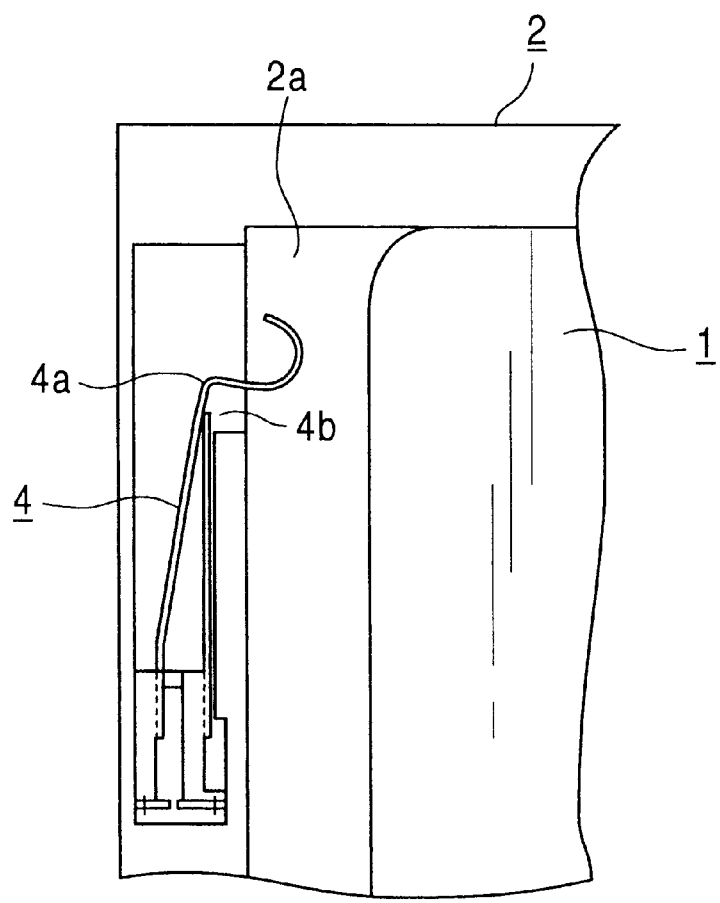

Then, as fast as the IC card 1 reaches the inmost position of the card insertion section 10a, as shown in FIGS. 9 and 10, the front end portion of the IC card 1 will press down the elastic piece 15 and then move beyond the click projection 15a so as to get in contact with the inner wall of the base 11. Meanwhile, the contact points formed on the bottom surface of the IC card 1 come into contact with the corresponding contact portions 13a of the terminals 13. Namely, the insertion of the IC card 1 may be considered to have been completed soon after a person inserting the IC card gets a click feeling caused due to the click projection 15a, then the IC card 1 may be kept in a predetermined position (a loading position) in the card insertion section 10a. Further, referring again to FIGS. 1 and 2, since the click projection 15a is located at a position just adjacent to the projected tongue piece 14c of the detecting switch 14, the front end portion of the IC card 1 will press down the click projection 15a, so that the projected tongue piece 14c will also be pressed down, thereby pressing down the actuator 14. In this way, soon after a person gets a click feeling, the detecting switch 14 will be changed over from its OFF state to its ON state, thereby permitting the person to detect whether the IC card 1 has been completely inserted in position in the card insertion section 10a. Therefore, after a person has inserted an IC card into the card insertion section 10a, he can confirm whether or not the IC card has been properly inserted in position, by observing a sound and a vibration which will occur at the time when the click feeling has been felt.

On the other hand, when the IC card 1 is pulled out of the card insertion section 10a, the IC card 1 will move from the loading position (shown in FIGS. 9 and 10), so that the click projection 15a will be moved upwardly by virtue of an elasticity of the elastic piece 15. At the same time, the actuator 14a will leave the contact element 14b, also by virtue of its own elasticity. In this way, the detecting switch 14 will be changed over from its ON position to its OFF position. Further, the contact portions 13a of the terminals 13 will be moved upwardly towards the card insertion section 10a due to an elasticity of each terminal 13, so that the IC card connector may return to its original condition as shown in FIGS. 2 and 3.

As is understood from the above description, with the use of the present invention, it is possible to obtain at least the following effects.

Namely, in the IC card connector of the present invention, the actuator of the detecting switch is provided with a projected tongue piece obliquely protruding toward the card insertion section, in a manner such that the projected tongue piece is adapted to be driven in the IC card's thickness direction by the IC card just before the completion of its insertion. Therefore, an elastic force of the actuator (this force will exert on the IC card which has been inserted in its loading position) may be made generally orthogonal to the IC card's discharge direction. In this way, with the passing of time even if there will occur a deterioration in a clamping force of the connector for clamping the IC card, the IC card will not be pushed by the detecting switch in its discharge direction and thus it is possible to avoid a position deviation of the IC card when in its inserted position, thereby increasing its reliability in use.

Further, in the IC card connector of the present invention, the actuator is fixed at a base end thereof on the housing so that a free end thereof is capable of getting into contact with the contact element and moving away therefrom, said actuator is further provided with the projected tongue piece at a middle position between the free end and the base end thereof, in a manner such that the projected tongue piece is protruding toward the outside of the actuator. Therefore, by merely slightly pressing the projected tongue piece, it will be possible for a free end of the actuator to obtain a large stroke movement, thus making it sure to more exactly perform an On/Off change-over of the detecting switch.

What is claimed is:

1. An IC card connector, comprising:

a housing including a card insertion section into which an IC card may be inserted:

a plurality of terminals each having a cantilever beam configuration secured through one end thereof on the housing, and each having a contact portion on a free end thereof, said contact portion being formed in a manner such that it is protruding toward the card insertion section;

a detecting switch located adjacent to an inmost position of the card insertion section, said detecting switch including an actuator and a contact element, the actuator being made of an electrically conductive material and adapted to be driven by an IC card just before the completion of its insertion, said actuator being also capable of coming into contact with the contact element and moving away therefrom so as to detect whether the insertion of the IC card is completed or not, wherein the actuator of the detecting switch is provided with a projected tongue piece obliquely protruding toward the card insertion section, in a manner such that the projected tongue piece is adapted to be driven in the IC card's thickness direction by the IC card just before the completion of its insertion, wherein the actuator is fixed at a base end thereof on the housing so that a free end thereof is capable of getting into contact with the contact element and moving away therefrom, said actuator is further provided with the projected tongue piece at a middle position between the free end and the base end thereof, in a manner such that the projected tongue piece is protruding toward the outside of the actuator.

* * * * *